Jan. 6, 1959        G. A. WISWELL        2,867,736
LIQUID DISPENSING APPARATUS
Filed Nov. 7, 1955                               3 Sheets-Sheet 1
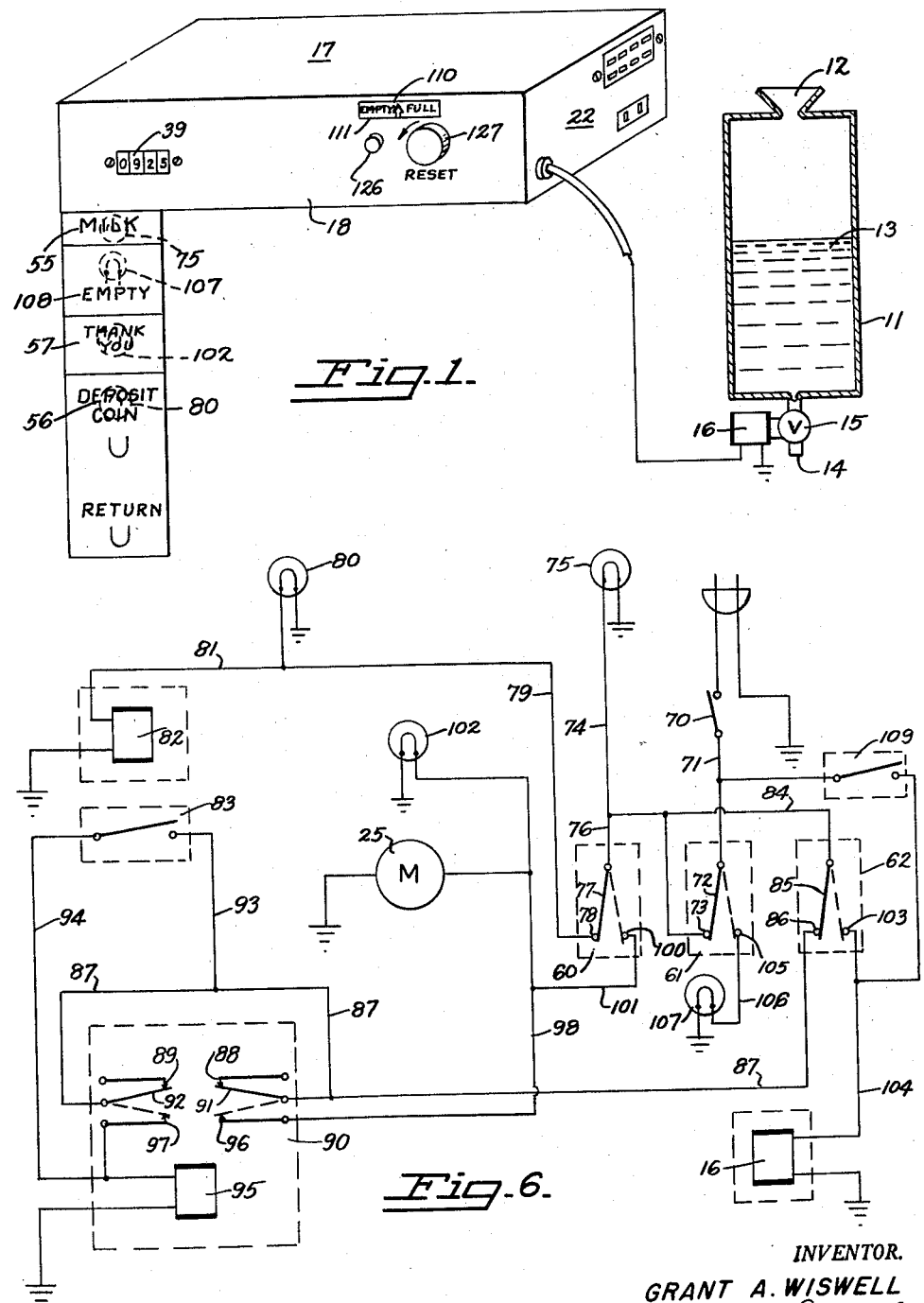
INVENTOR.
GRANT A. WISWELL
BY
ATTORNEY Jan. 6, 1959  G. A. WISWELL  2,867,736
LIQUID DISPENSING APPARATUS
Filed Nov. 7, 1955  3 Sheets-Sheet 2
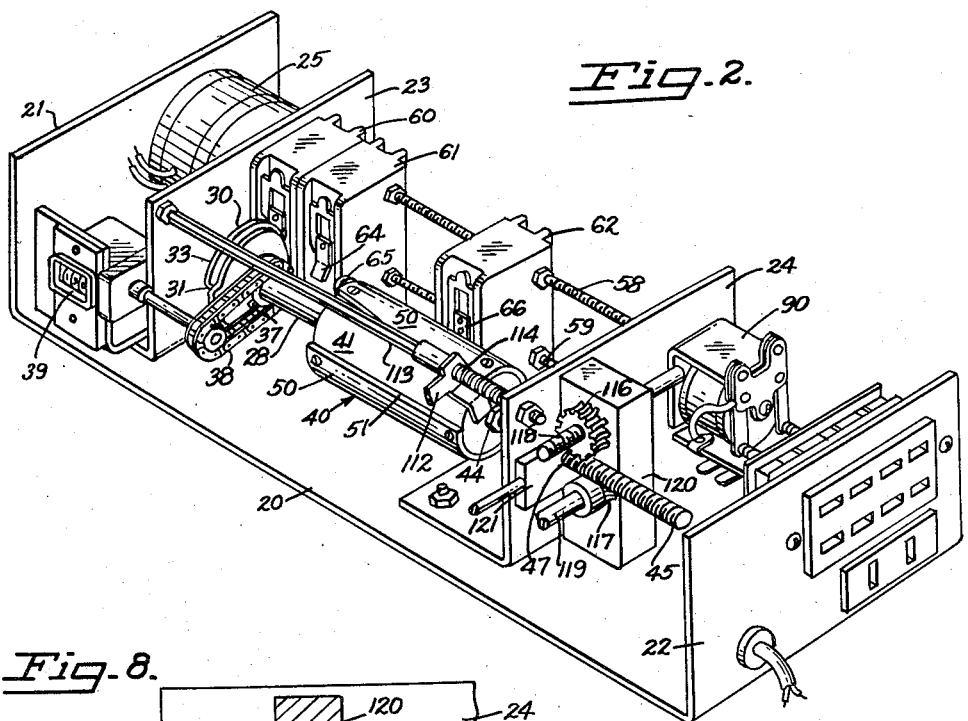
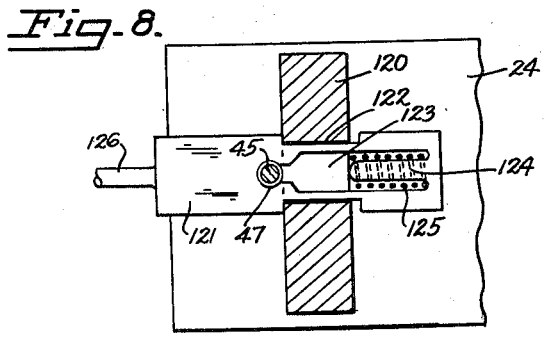
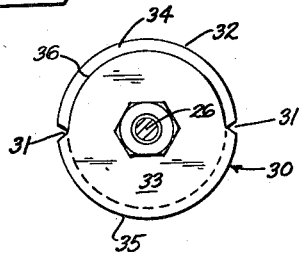
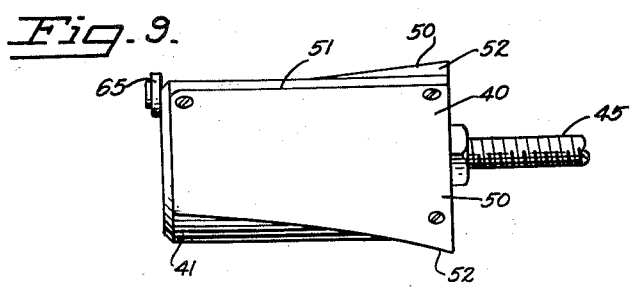
INVENTOR.
GRANT A. WISWELL
BY
ATTORNEY Jan. 6, 1959 G. A. WISWELL 2,867,736
LIQUID DISPENSING APPARATUS
Filed Nov. 7, 1955 3 Sheets-Sheet 3

INVENTOR.
GRANT A. WISWELL
BY
ATTORNEY

2,867,736

LIQUID DISPENSING APPARATUS

Grant A. Wiswell, Burlingame, Calif.

Application November 7, 1955, Serial No. 545,373

9 Claims. (Cl. 307—141)

This invention relates to a liquid dispensing apparatus. More particularly, it relates to an electrical control device for a liquid valve of the gravity type in which compensation for decreased head in a storage container is automatically provided by increasing the time that the valve stays open, so that the same amount of liquid is dispensed each time over a long series of dispensing cycles.

The amount of liquid dispensed from a storage container through a constant orifice valve, during a given interval of time, varies with the height of the liquid in the container. When the container is full, the liquid flows out much faster than when the container is nearly empty. In other words, the amount of liquid dispensed varies directly with the time the valve is open and inversely with the height of liquid in the container.

There has long been a need for a liquid-dispensing apparatus that will give the same amount of liquid each time a circuit is momentarily energized by a push button, a coin-operated device, or by an automatic cycling contactor, such as is used in packaging equipment and other applications of automatization of container-filling. Push-button dispensers are in particular demand by restaurants for coffee, milk and other liquids, while coin-operated dispensers can be installed in various public places. There is also demand for the valving of liquids, in pre-determined volume from reservoirs and casks, where the liquid circuit must not contact reactive materials; an example of this would be found in the chemical industry, where a liquid must travel through a particular plastic tubing circuit but be dispensed accurately; another need exists for valving liquids where completely sterile conditions must be maintained throughout the dispensing cycle.

One object of the present invention is to provide an apparatus that will satisfy these demands and fill these needs. In accomplishing this object my invention solves the problem of balancing the height of the liquid in the dispensing reservoir against the time the dispensing valve stays open. The present invention has solved this problem by providing a control apparatus that automatically increases the time over which fluid is dispensed so as to adjust for the decrease in liquid pressure.

My invention accomplishes these important results by employing a cam device to open and close a sensitive switch that energizes and de-energizes the solenoid which opens and closes the valve. The cam device comprises a shaped cam plate mounted on a rotatable drum that travels axially as it rotates, thereby shifting its position with respect to the switch each time it opens and closes the valve. The cam is so shaped that the valve stays on longer each time, in an amount that corresponds exactly to the decrease in pressure (and therefore of flow-rate through the valve).

The invention solves other important problems, such as indicating the quantity of liquid remaining in the storage container, providing for easy re-setting when the container is refilled, and insuring the completion of a cycle by the motor that rotates the drum regardless of the amount of liquid dispensed, so that the drum rotates the same amount each cycle. The invention also provides for an automatic cut-off of the entire device when the container is empty or so nearly so that turbulence disturbs the measurement. It does these things by an electrical circuit incorporating three single-pole, double-throw switches, and a starting relay as well as the solenoid that controls the liquid dispensing valve. These elements are in combination with the electric motor which rotates the cam drum. The same motor rotates another cam which controls a second switch, to keep the motor rotating after the initial impulse from the starting relay and until completion of a cycle of that cam. As the drum gradually moves axially, it aproaches and finally, when the container is nearly empty, trips a third switch that shuts off the entire circuit in the dispensing apparatus.

The switches also may be used to control a series of signal lights which indicate to the user the state of the apparatus.

Other objects and advantages of the invention will appear from the following description of a preferred embodiment thereof.

In the drawings:

Fig. 1 is a view of a dispensing apparatus incorporating the principles of the present invention. The control device is shown in perspective, and the remainder of the apparatus is shown diagrammatically, with the plugs mostly omitted from the sockets.

Fig. 2 is an enlarged view in perspective of the electrical control device which operates the solenoid valve, shown with the cover and a few other parts removed.

Fig. 6 is an electrical circuit diagram of the apparatus.

Fig. 7 is a view in section taken along the line 7—7 in Fig. 3.

Fig. 8 is a view in section taken along the line 8—8 in Fig. 3.

Fig. 9 is a top plan view of the cylindrical cam.

Figure 3:
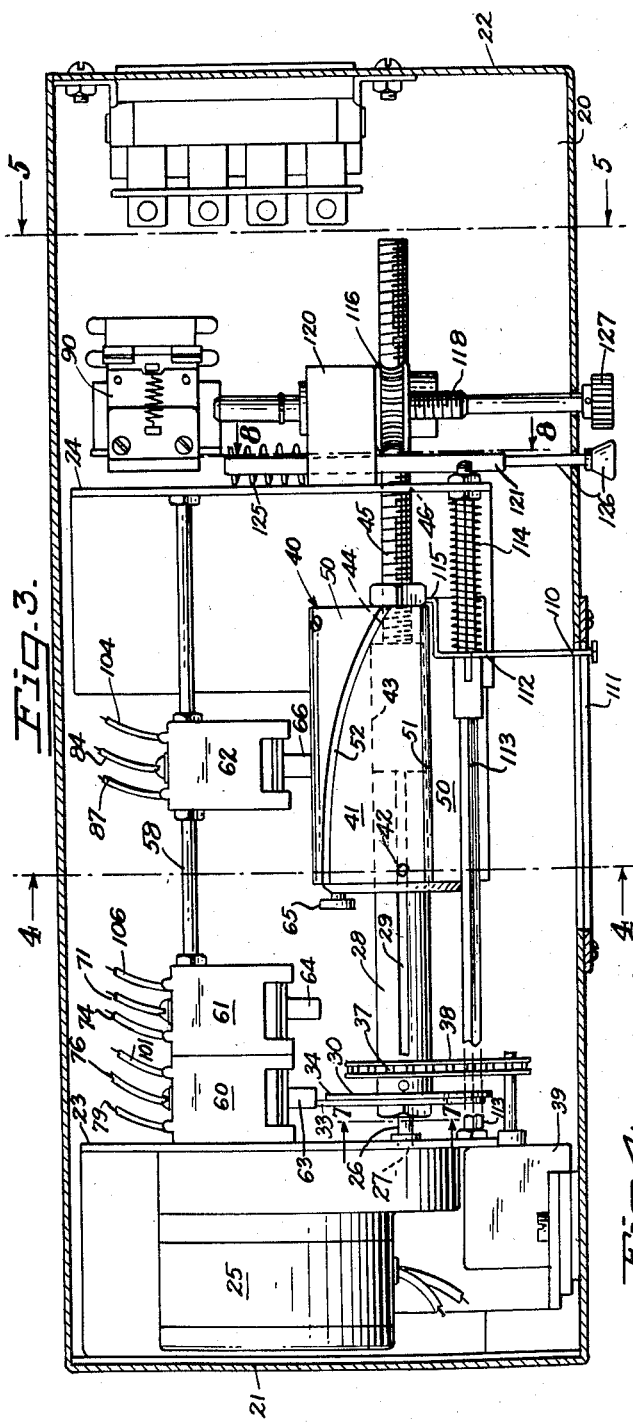
Fig. 3 is a further enlarged top plan view of the control apparatus shown in Fig. 2.
Figure 5:
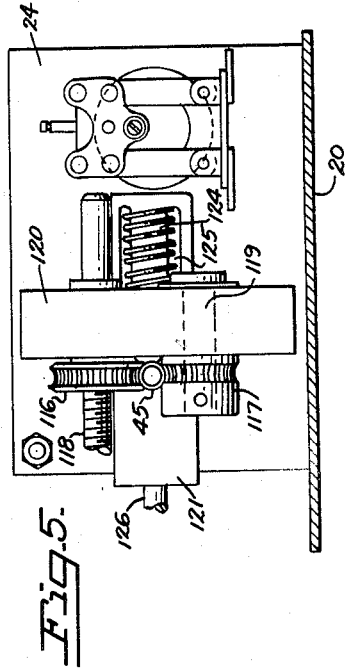
Fig. 5 is a view in section taken along the line 5—5 in Fig. 3, omitting the housing.
Figure 4:
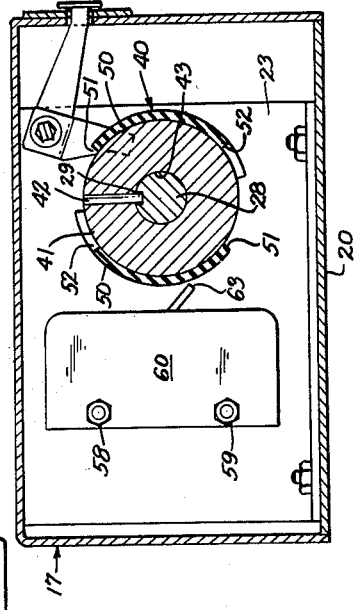
Fig. 4 is a view in section taken along the line 4—4 in Fig. 3, but showing also the housing.

The dispenser combination (Fig. 1) includes a container 11 having an opening 12 through which it is filled with liquid 13 and an outlet 14 through which the liquid 13 is dispensed. At the outlet 14 is a valve 15 controlled by a solenoid 16. When the solenoid 16 is actuated, the valve 15 opens the outlet 14, and liquid 13 flows out by gravity. When the solenoid 16 is de-energized, no liquid passes. The solenoid 16 is actuated and de-actuated by an electric control device 17, which will now be described in detail.

THE CONTROL DEVICE 17 IN GENERAL

The control device 17 is contained in a housing 18 and is supported on a horizontal base plate 20 having integral vertical flanges 21 and 22 or separate support members at each end thereof. A pair of L-shaped brackets 23 and 24 are secured to the base 20 in between the flanges 21, 22 parallel to the flanges and to each other.

THE MOTOR-CONTROL CYCLE-COMPLETION CAM 30

A synchronous electric motor 25 (preferably a gear motor) supported by the bracket 23, between the bracket 23 and the end plate 21, turns a shaft 26 which projects beyond an opening 27 through the bracket 23. The motor acts as a timer for the valving. The shaft 26 may be rigidly secured, as by press fitting, to an enlarged shaft 28 having an axial groove 29 and supporting a discshaped cycle-completion cam 30 adjacent its end near the bracket 23.

The cam 30 has one or more notches 31 (two are shown) in its periphery 32 and may be constructed integrally or, as shown, from two identical elements 33, 34, each having one-half 35 of its circumference of larger radius than the other half 36. The cam 30, as will be shown, keeps the motor 25 running, once it is started for the length of time necessary to complete a cycle. If the cycle were to be a 360° rotation of the shaft 26, there would be only one notch 31; if (as here) the cycle is 180°, there are two notches 31; if the cycle were to be 120°, there would be three notches, and so on.

The shaft 28 may also support, adjacent the cam 30, a counting gear 37 linked (as by a chain 38), to a counter 39, that tells how many cycles have ben completed; i. e., how many cups or glasses of liquid 13 have been dispensed.

THE SOLENOID-CONTROL CAM 40

Beyond the counter gear 37, the shaft 28 supports a cam device 40 that controls the solenoid 16. The cam device 40 comprises a hollow drum 41 splined to the shaft 28 by a pin 42 that engages the groove 29; the drum 41 is therefore slidable axially along the shaft 28 but rotates with it. The drum's axial central opening 43 has a reduced outer end 44 whose interior threads engage a threaded shaft 45 that turns with the drum 41. The threaded shaft 45 projects through an opening 46 in the bracket 24 and engages a half-nut 47, which will be discussed later in detail. For the present, it will suffice to say that as the shafts 26, 28 and 45 turn, the shaft 45 moves to the left (as seen in the drawings) by virtue of its engagement with the half-nut 47, and carries the drum 41 to the left one half-pitch of its threads for each cycle of the cam 30.

Mounted rigidly on the peripheral surface of the drum 41, and diametrically opposite each other are an identical pair of cylindrical-shell cam plates 50, 50. There are as many cam plates 50 as there are notches 31; so in any particular device there may be more or fewer plates. Each plate 50 has one straight axial edge 51 and one curved edge 52. The curved edge 52 is spaced from the straight edge 51 to correspond to an inversion of the pressure curve for the container 11. In other words, as the height of the liquid 13 in the container 11 drops (as it does each dispensing cycle, the pressure drops. This is in accordance with the equation $P=kvgh$, when $P$ is the pressure, $h$ is the height of the fluid, $g$ is the acceleration of gravity, $v$ is the viscosity of the fluid and $k$ is a constant. The curve 52 is spaced from the edge 51 a distance $d$ such that $$d = \frac{c}{p} = \frac{c}{kvgh}$$

where $c$ is a constant. This curve may be determined empirically or theoretically for each dispenser-liquid-valve combination. In either event it is tested to make sure that it correctly balances the decrease in fluid pressure by extending the time that the valve stays open.

THE MICROSWITCHES 60, 61 and 62 MOUNTED OPPOSITE THE CAMS 30 AND 40

A pair of rods 58, 59 preferably threaded, extend between the two brackets 23, 24 generally parallel to the shaft 28 and support thereon three microswitches 60, 61, and 62, each of the single-pole, double-throw variety. This parallel mounting and the use of threaded shafts make it possible to obtain the necessary perfect alignment between the switches 60, 61, and 62 and the cams 30 and 40.

The switch 60 has its lever 63 adapted to engage the periphery 32 of the cycle-completion cam 30. The normal, spring-urged position of the switch 60 is the one it assumes when its lever 63 engages a notch 31 of the cam 30, and it then closes one circuit (as will be seen when the circuitry is described); when the lever 63 engages the preriphery 32 it opens that circuit and closes a different circuit.

The switch 61 is a master control switch that is actuated only when the container 11 is empty, and then it closes down all power to the control device 17 and gives a signal, as will be described later. Its lever 64 is contacted by a projection 65 on the drum 41 when the drum 41 has been moved its full length along the shaft 28.

The switch 62 controls the dispensing valve 15 by energizing and de-energizing the solenoid 16. Its lever 66 is in its normal position when engaging the surface of the drum 41 and is moved to change circuits when it engages either of the cam plates 50.

THE ELECTRIC CIRCUIT

Fig. 6 shows how the electric circuit operates the valve 15 and other associated parts. This diagram will best be understood from a description of its operation.

(1) Normal non-operating positions of the switches 60, 61 and 62

A manually controlled power switch 70 turns the power on or off for the entire device. When the power is off there is no operation of any kind, but when the power is on current passes through a power lead 71 to the microswitch 61, which in its normal position leads through its switch element 72 to the left-hand contact 73, and sends power along the line 74 to light the indicating lamp 75. The lamp 75 shows the power is on and preferably illuminates a sign 55 that indicates what type of liquid 13 is in the dispenser 11.

Power simultaneously passes from the contact 73 through the lead 76 to the microswitch 60, which is in its normal position, with its switch element 77 against its left contact 78. Power from the contact 78 passes through the line 79 to a second indicating lamp 80, which may illuminate a sign 56 having a legend such as "Deposit coin," indicating that the machine will dispense if money is deposited. A lead 81, parallel with the lamp 80, passes to the coin rejector hold-in coil 82. When the power is off (e. g., when the switch 70 is open), and the coil 82 de-energized, all coins will be rejected and returned to the customer. When the coil 82 is energized, it will pass coins on to the coin-actuated switch 83. However, unless a coin is deposited, the switch 83 is open and no current passes through it. If the device 17 is not to be used in a coin-controlled circuit, the lead 79 may lead directly to a relay 95, with a push-button switch being interposed for initiating the circuit.

Power also passes from the contact 73 through the line 84 to the microswitch 62, which is normally positioned, as shown in solid lines, with its switch element 85 against the left contact 86. Current then passes through the line 87 to the upper contacts 88, 89 of a double-pole, double-throw relay switch 90, its normal position being that shown in solid lines in Fig. 6, with its poles 91, 92 against the contacts 88, 89, which lead nowhere and so nothing happens. The relay switch 90 is mounted in the bracket 24, as shown in Figs. 2 and 3.

(2) Operation sequence

Operation begins when the switch 83 is actuated by dropping a coin in its associated receptacle (or by throwing a switch in a similar circuit position). When the switch 83 is closed a pulse of current passes from the line 87 through the line 93, across the switch 83, through the line 94, to a relay coil 95 of the relay 90, energizing the coil 95 and throwing the double poles 91, 92, against the lower contacts 96, 97. When the pole 91 is thrown against the contact 96, current from the lead 87 passes through a lead 98 and starts the gear motor 25. Since the switch 83 is closed for only a fraction of a second, the pole 91 is held against the contact 96 long enough to get the cam 30 rotated sufficiently for the switch lever 63 to get out of the notch 31 and on to the periphery 32.

This is done by the pole 92, which once thrown keeps current flowing through the coil 95, as long as the line 87 receives power.

As soon as the gear motor 25 drives the shafts 26, 28 and rotates the cam 30 a very slight amount, the lever 63 of the microswitch 60 is moved out of the notch 31 and throws the switch element 77 from the left contact 78 to the right contact 100. Power then passes directly to the gear motor 25 through the line 101 so that its keeps rotating. At the same time the motor 25 is started, an indicating lamp 102 is lighted, illuminating a sign 57 with a message, such as "Thank you."

Since the switch element 77 of the microswitch 60 has moved away from the contact 78, the lamp 80 is turned off and the circuit through the coin rejector hold-in coil 82 is broken. Therefore, any coin deposited while the motor 25 is running will pass immediately through the coin return back to the customer.

As the motor 25 turns, the drum 41 rotates. When the lever 66 of the microswitch 62 strikes the cam 50, it throws the switch element 85 away from the contact 86 and against the contact 103. Current then stops flowing to the relay 90, and the poles 91, 92 return to their normal position, as shown in solid lines. Current now passes through the switch 62 to the solenoid 16, via the line 104. This opens the valve 15 and dispenses fluid as long as the microswitch lever 66 rides on the cam plate 50. When the lever 66 passes off the edge 52 of the cam plate 50, the switch element 85 is thrown back to the contact 86, the solenoid 16 is de-energized, the valve 15 is closed, and fluid stops flowing.

However, the motor 25 is not effected by the microswitch 62, and it continues turning the shafts 26, 28 and 45 and the cam drum 41 until the next notch 31 in the cam 30 is reached. When the notch 31 is engaged by the microswitch lever 63, the switch element 77 is moved away from the right contact 100 to the left contact 78, thereby stopping the motor 25, turning off the lamp 102, lighting the lamp 80, and re-energizing the coin rejection hold-in coil 82, so that the apparatus is ready for another cycle.

Operation continues this way, cycle after cycle. Each cycle, the cam drum 41 and its threaded shaft 45 move to the left, one half-pitch. The shape of the cam plates 50 keep the microswitch 60 on a little longer each cycle. In that manner, as the head of the liquid 13 in the dispenser 11 drops, the valve 15 stays open longer, the increased length of time balancing the lower pressure and insuring that the same amount of liquid 13 will be dispensed each cycle.

As the cam drum 41 moves further to the left and the liquid 13 drops lower and lower in the dispenser, there finally comes a time when the container 11 is so nearly empty that no more liquid 13 can or should be dispensed. At that time the projection 65 on the cam drum 40 engages the lever 64 of the microswitch 61. This throws the switch element 72 from the left contact 73 to the right contact 105, cutting off all the power to the device and sending power through a line 106 to a lamp 107, or other signal. The lamp 107, may, for example illuminate a sign 108 with a legend such as "Empty." It may also or alternatively ring a buzzer or other signal if desired. The operator then knows that it is time to refill the container 11 with liquid 13. If he wishes to drain any remaining liquid 13 from the container 11, he may utilize the manual switch 109 which passes power directly from the power line 71 to the solenoid 16.

RE-SETTING THE CONTROL DEVICE

When the container 11 has been re-filled, the control device 17 must be reset. The operator knows this because of two things:

(1) Unless the switch 61 is released, all power will be off and he will have to dispense the liquid 13 by hand, using the switch 109.

(2) An indicator needle 110 points to "Empty" on a calibrated scale 111. The needle 110 is secured to a bracket 112 mounted slidably on a shaft 113 that is parallel to the shafts 26, 28 and 45, and is supported by the brackets 23 and 24. The bracket 112 is urged to the left by a spring 114 away from the bracket 24, and its arm 115 is in contact with the right radial end of the drum 41; so the needle 110 indicates the translational position of the drum 41 and thereby the volume of liquid in the container 11.

The shaft 45 is normally in contact with the half-nut 47, which causes its translational movement to the left. It also is in contact with a pair of knurled pinions 116, 117, preferably having concave faces and adapted to retain the shaft 45 in true alignment. These pinions are mounted on stub shafts 118, 119, which are journaled in a block 120, which is supported rigidly by the base 20 and the bracket 24.

The half-nut 47 is part of a bar 121 which is mounted slidably through a recess 122 in the block 120. The bar 121 has an opening 123 extending from the half-nut 47 inwardly through a portion of which projects an aligning pin 124. A spring 125 surrounds the pin 124, being seated at one end against the bar 121 and at the other end against the block 120, thereby normally maintaining the half-nut 47 in engagement with the shaft 45.

By pulling out the bar 121, as by a handle 126, the shaft 45 may be moved to the right or left. For resetting, the handle 126 is pulled out and the shaft 45 is moved to the right by turning a knob 127 mounted on the same stub shaft 118 as the pinion 116. When the shaft 45 moves to the right, the drum 41 is moved with it, sliding along the shaft 28. The drum 41 is moved until the indicator 110 reads "Full" or until the indicator 110 corresponds exactly with the amount of liquid 13 in the container 11. The machine is then ready for a new series of dispensing cycles.

SUMMARY OF OPERATION

Normally the device appears with the switches and other elements as shown in solid lines in Fig. 6, so that the signs 55 and 56 are lighted and the other signs 57 and 108 are dark. For coin operation, the user deposits his coin, thereby closing the switch 83, which throws the relay switch 90 and thereby sends the current to the motor 25. Once the motor 25 has turned the shafts 26, 28 and 45 sufficiently for the cam 30 to disengage its notch 31 from the lever 63, the switch 60 is thrown and current passes directly to the motor 25 for the rest of the cycle. Simultaneously, the lamp 102 lights the sign 57, the relay 90 is de-energized, the lamp 80 is turned off, and the coin hold-in coil 82 is de-energized, so that any coin deposited during the cycle will be returned.

The motor 25 rotates the cam 40, and when the cam plate 50 engages the switch lever 66, the solenoid valve 16 is energized; fluid is dispensed through the valve 15 as long as the lever 66 rides on the cam plate 50. When the lever reaches the end 52 of the cam plate 50, the solenoid 16 is de-energized and closes the valve 15. The motor continues turning until the lever 63 engages a cam notch 31. Then the motor stops, the lamp 102 is turned off, the lamp 80 is again lighted and the hold-in coil 82 is energized.

As the cam 40 goes to the left each cycle (an amount equal to one half-pitch of the threaded shaft 45) the distance between the edges 51 and 52 of the cam plate 50 become greater over the path contacted by the switch lever 66, thereby energizing the solenoid 16 over a longer interval of the time each cycle, so that the drop in the pressure head of the liquid 13 is exactly balanced by the longer dispensing time. When the container is nearly empty, the projection 65 engages the lever 64 of the switch 62 to cut off all the power to the dispenser and to light the lamp 107 and the sign 108, which says "Empty."

The container 11 is then re-filled through the opening 12 and then the control device 17 is reset by pulling out the handle 126 and rotating the knob 127 until the cam 40 is moved all the way to the right, as is shown by the needle 110 reading "Full." Then a new series of dispensing cycles can begin.

If there is no coin control, the operation is the same, except that a push-button or other type of switch replaces the hold-in coil 82 and switch 83. In fact, the switch 83 may be read as a push button or other manually controlled switch, and the circuit will then be identical to that shown in Fig. 6, except that the lead 79, lamp 80, lead 81, and hold-in coil 82 are simply omitted. For that reason no special diagram of the manual non-coin operated circuit has been shown. In every other particular, operation is identical to that already described.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A control device for use in combination with a dispensing apparatus wherein liquid is dispensed from a storage container by a timed valve, said control device including in combination a rotatable cylindrical drum having mounted thereon at least one cam plate, said cam plate being shaped so that the distance between its two substantially axial edges corresponds inversely to the pressure head curve of the liquid in the container; stationary means actuated by said cam plate when said drum is rotated and held actuated by said cam plate during an interval; means to rotate said drum at a uniform speed past said stationary means; and means to translate said drum axially as it rotates, so as to subject said stationary means to a different segment of said cam plate each time they contact each other and thereby to hold said stationary means actuated longer intervals each time, in an amount to compensate for the decrease in head, so that the same amount of liquid is dispensed each cycle.

2. The device of claim 1 wherein said drum translating means comprises a threaded shaft secured rigidly to said drum and a stationary half-nut threadably engaging said shaft, said half-nut being releasable for re-setting said shaft and drum.

3. The device of claim 2 wherein said drum rotating means includes a shaft splined to said drum for rotational movement and on which said drum can translate.

4. The device of claim 1 in which said drum rotating means includes a synchronous electric motor.

5. An electrical control device for use in combination with a dispensing apparatus wherein liquid is dispensed from a storage container by an electrically controlled valve, said control device including in combination a rotatable cylindrical drum having mounted thereon at least one cam plate, said cam plate having one straight axial edge and one curved axial edge, the curved edge being shaped to correspond inversely to the pressure head curve of the liquid in the container; stationary switch controlling means engaging said drum and actuated by said cam plate when said drum is rotated; means to rotate said drum at a constant speed so as to move said cam plate across said switch controlling means; and means to translate said drum axially as it rotates, so as to subject said switch operating means to a different segment of said cam plate each time they contact each other.

6. The device of claim 5 in which said translation means includes a threaded shaft extending axially out one end of said drum and a half-nut threadably engaging said shaft and adapted for movement only perpendicular to said shaft, for release thereof for re-setting.

7. The device of claim 6 in which said half-nut is normally spring urged into engagement with said shaft.

8. The device of claim 5 in which said drum is rotated by a synchronous electric motor that turns a shaft to which said drum is splined for free translational movement, but linked rotational movement.

9. The device of claim 8 in which there is a cycle-completion cam and a switch actuated thereby, to insure a uniform amount of rotation of said shaft each cycle.

References Cited in the file of this patent

UNITED STATES PATENTS

| | | |
|---|---|---|
| 2,263,055 | Smith | Nov. 18, 1941 |
| 2,365,901 | Perkins | Dec. 26, 1944 |